(12) United States Patent
Lewis et al.

(10) Patent No.: US 8,014,801 B2
(45) Date of Patent: Sep. 6, 2011

(54) METHOD AND APPARATUS FOR BLOCKING ID INFORMATION ASSOCIATED WITH A SENDER OF A SHORT MESSAGING SERVICE (SMS) MESSAGE

(75) Inventors: John Lewis, Lawrenceville, GA (US); Justin M. McNamara, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 12/480,559

(22) Filed: Jun. 8, 2009

(65) Prior Publication Data
US 2009/0247198 A1    Oct. 1, 2009

Related U.S. Application Data

(63) Continuation of application No. 11/148,774, filed on Jun. 8, 2005, now Pat. No. 7,546,117.

(51) Int. Cl.
*H04W 4/00*   (2009.01)

(52) U.S. Cl. ..... 455/466; 455/411; 455/418; 455/432.2; 370/352; 370/349; 370/353

(58) Field of Classification Search .......... 455/466, 455/411, 418, 432.2
See application file for complete search history.

(56) References Cited

U.S. PATENT DOCUMENTS

| | | | |
|---|---|---|---|
| 6,591,291 B1 * | 7/2003 | Gabber et al. | 709/206 |
| 2002/0110227 A1 * | 8/2002 | Bedingfield et al. | 379/88.19 |
| 2004/0106418 A1 * | 6/2004 | Cini et al. | 455/466 |
| 2006/0026438 A1 * | 2/2006 | Stern et al. | 713/184 |
| 2006/0224525 A1 * | 10/2006 | Dahlin et al. | 705/80 |

* cited by examiner

*Primary Examiner* — Kwasi Karikari
(74) *Attorney, Agent, or Firm* — Moazzam & Associates, LLC

(57) ABSTRACT

A component of the wireless network detects when a party who is sending an electronic message desires to have the sender's ID information blocked. If a determination is made that the sender's ID information is to be blocked, the network component removes the ID information from the communication and transmits the message to the intended recipient without the sender's ID information being included in the transmission.

20 Claims, 3 Drawing Sheets

METHOD AND APPARATUS FOR BLOCKING ID INFORMATION ASSOCIATED WITH A SENDER OF A SHORT MESSAGING SERVICE (SMS) MESSAGE

This application is a continuation of U.S. patent application Ser. No. 11/148,774, filed Jun. 8, 2005, now U.S. Pat. No. 7,546,117, which is incorporated by reference herein in its entirety.

TECHNICAL FIELD OF INVENTION

The invention relates to wireless communications. More particularly, the invention relates to allowing a party who is sending a Short Messaging Service (SMS) message to block the party's identification information so that the recipient of the SMS message is unable to ascertain the source of the SMS message.

BACKGROUND OF THE INVENTION

In landline and wireless networks, a feature known as Caller-ID allows users to view the telephone number of the person who is calling them. The telephone number of the calling party typically is displayed on a display device of the user's telephone. A signaling protocol known as Signaling System 7 (SS7) provides for transmitting signaling information that includes the telephone number of both the calling and called parties. The signaling information is transmitted over a different channel from the channel over which the voice or data is transmitted. Components in the network route the signaling information and the voice and/or data to the called party's telephone. Logic in the telephone causes the telephone number of the calling party to be displayed on the display device of the called party's telephone.

A party who is placing a call has the ability to block the telephone number of the telephone from which the call is being placed by entering a specific series of digits immediately preceding the telephone number of the party they are calling. For example, in some landline networks, if the digits "*67" are dialed immediately prior to dialing the telephone number of the party who is being called, the telephone number of the party who is placing the call will be blocked, and therefore will not be displayed on the called party's telephone. This is useful in various situations in which the calling party desires to preserve his or her privacy by preventing his or her telephone number from being revealed.

SMS is a messaging protocol that allows short text messages to be sent via wireless networks to and from wireless devices, such as, for example, wireless telephones, personal digital assistants (PDAs), etc. The wireless network has components that are responsible for determining the destination addresses and for transporting the short messages between the SMS centres (SMSCs) and the wireless devices. In contrast to other existing text-message transmission services, such as alphanumeric paging, SMS provides guaranteed delivery of text messages because the message is stored in the SMSC until the destination wireless device becomes available. Thus, SMS provides a store-and-forward service for short (i.e., no more than 160 alphanumeric characters) text messages.

As wireless networks and technology have evolved, a variety of services that use SMS have been introduced, including, for example, email, fax, paging, interactive banking, information services and integration with Internet-based applications. Although SMS messaging continues to grow, it is not currently possible for a sending party who is sending an SMS message to block the sending party's identification (ID) information (e.g., email address or telephone number). It would be desirable to provide a feature that enables a sender of an SMS message to block the sender's ID information, thereby preventing the sender's ID information from being displayed on the intended recipient's wireless device.

SUMMARY OF THE INVENTION

In accordance with the invention, intelligence is provided in a component or components of the wireless network that detects when a party who is sending an electronic message desires to have the sender's ID information blocked. If a determination is made that the sender's ID information is to be blocked, the network component removes the ID information from the communication and transmits the message to the intended recipient without the sender's ID information being included in the transmission.

The apparatus of the invention comprises detection logic that detects if the message also includes an indicator that indicates that the ID information associated with the wireless device of the sender of the message is to be blocked, and message creation logic that creates a new message that includes a blocking reference, the ID information associated with the intended recipient's wireless device, and the message contents.

The method of the invention comprises detecting if an electronic message includes an indicator that indicates that the ID information associated with the wireless device of the sender of the message is to be blocked, and creating a new message that includes the blocking reference, the ID information associated with the intended recipient's wireless device, and the message contents.

The invention also comprises a computer program for blocking ID information associated with a wireless device of a sender of an electronic message. The program comprises a first code segment for detecting if the message also includes an indicator that indicates that the ID information associated with the wireless device of the sender of the SMS message is to be blocked, and a second code segment for creating a new message that includes the blocking reference, the ID information associated with the intended recipient's wireless device, and the message contents.

These and other features of the invention will become apparent from the following description, drawings and claims.

DETAILED DESCRIPTION OF THE PREFERRED EMBODIMENT

Figure 1:
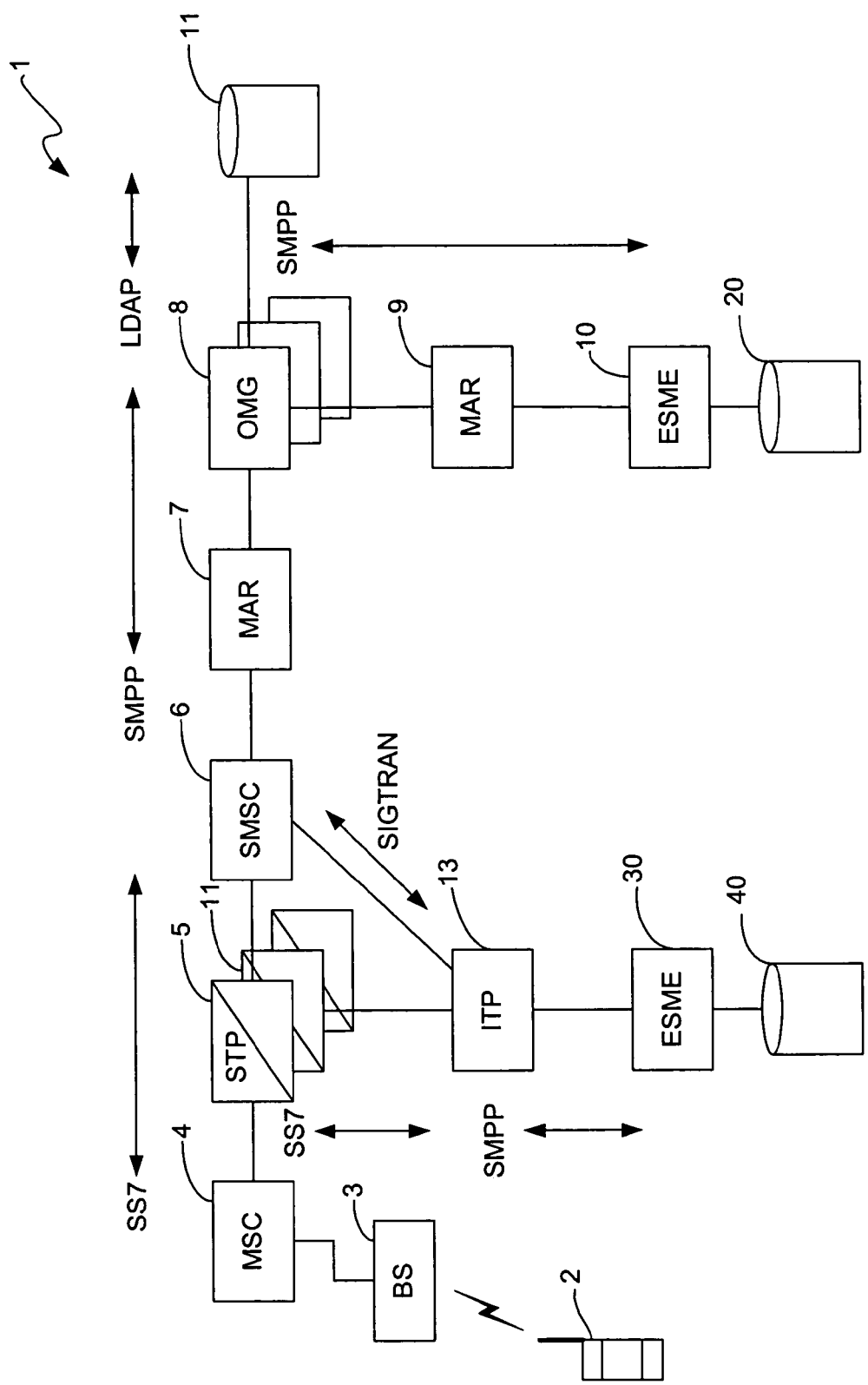
FIG. 1 illustrates a block diagram of an SMS network in which the invention may be implemented.

In accordance with the invention, intelligence is provided in a component or components of the wireless network that detects when a party who is sending a message desires to have the sender's ID information blocked. If a determination is made that the sender's ID information is to be blocked, the network component removes the ID information from the communication and transmits the message to the intended recipient without the sender's ID information being included in the transmission. The manner in which ID information blocking is accomplished is described below in detail with reference to an embodiment of the invention.

Prior to describing the mechanism of the invention for performing ID information blocking, various examples of useful SMS ID blocking scenarios will be provided. When the user creates an SMS message, the user will preface the destination address associated with the intended recipient with a particular code that the network will recognize as an indication that the sender's ID information is not to be presented to the intended recipient. For example, assuming an SMS message is being sent by a sender's wireless device having telephone number 4045551111 to a recipient's wireless device having telephone number 4045552222. The sender will preface the recipient's telephone number with a preselected code, such as, for example, "*67". Therefore, the recipient's telephone number with the code will be displayed on the display device of the sender's wireless device as: *674045552222.

The following is an example in which the sender is bidding on an automobile that the recipient is selling. The following information is displayed on the display device of the sender's wireless device:

Example 1

Msg: Bid for Car, Are you willing to accept $1,500.00 for your car?
From: 4045551111
To: *674045552222

When the sender selects the "Send" option on the wireless device, the message will be sent to the wireless device address of the intended recipient. The network will detect that the "*67" code precedes the recipient's telephone number and will strip the sender's telephone number from the message so that the sender remains anonymous. The Network will store a link to the originating number referenced by the text with which the originating number is being replaced. This link will use the destination address and the new text string to reference the originator This string may be "Anonymous" or "Unknown". This new originating address shall be routable back to the network element in the event that the recipient replies to the message. The SMS message received by the recipient is displayed on the recipient's wireless device as:

Example 2

From: Unknown
To: 4045552222
Msg: Bid for Car, Are you willing to accept $1,500.00 for your car?

Thus, the sender's ID information (i.e., the sender's telephone number in this example) is not displayed to the recipient and the sender remains anonymous. Also, as shown in Example 2, the "*67" code preferably is not included so that it is not apparent to the intended recipient that the sender has blocked the sender's ID information.

The ID information that the invention filters on is typically the E164 mobile device number. The E164 number is typically the mobile station integrated services digital network (MSISDN/MIN), which is the eleven-digit telephone number of the wireless user. However, the invention is not limited to filtering on any particular type of ID information. For example, in the case in which the SMS message originates from an electronic mail (email) address, the ID information that the invention filters on will typically be the email address from which the message originated. In Example 1 above, the originating address was in E164 format. However, as shown in Example 2, the new message has an originating address that is in alphanumeric format. The logic that performs the task of creating the new message may query a database to determine the destination's capabilities. If the destination is, for example, a Global System for Mobile Communications (GSM) handset, then the alphanumeric format is appropriate. However, if the destination does not have these capabilities (e.g., time division multiple access (TDMA) or unknown), then the network component may replace the originating address with a common E164 address (e.g., 2562533, which spells "Blocked" or 1111).

In addition, the invention is not limited to blocking ID information in SMS messages. The invention applies equally to blocking ID information typically included in other types of electronic messages, such as, for example, Session Initiation Protocol (SIP) messages sent via Voice over Internet Protocol (VoIP), instant messaging (IM) messages sent over the Internet, pager messages sent by Interactive Messaging, multimedia messaging service (MMS) messages, email messages, etc. Although these other types of messages are sent using protocols and networks that are different from those used for SMS messages, a similar mechanism as that described above with reference to the ESME could be used for ID blocking in these other types of networks. Persons skilled in the art will understand, in view of the description provided herein, the manner in which the invention can be implemented for these other types of messages. The term "electronic message" will be used herein to mean all of types of messages that are sent electronically over a network.

In accordance with another aspect of the invention, rather than indicating that the message is from an "unknown" party, the sender's identity is disguised. For example, when the network detects that a destination telephone number is prefaced by the "*67" code, the network may send a prompt to the sender asking the sender if he or she wishes to be identified in a particular manner. The sender may then enter an alias that is to be used as the identifier for the sender. The sender can configure this globally for whenever they user the *67 text service. An example of a way to enable this would be to have the sender send a short message to "*69" (or some other network routing code) that includes the text the sender wants to be displayed in place of the sender's address (e.g., up to 20 characters). The network component that performs the invention will then store a link for this source MSISDN to the text to be displayed. For example, assuming the sender enters the alias "Interested Buyer" when setting up their alias address, the sender would first send a text message such as:

Example 3

From: 4045551111
To: *69
Msg: "Interested Buyer"

When the sender wants to send the actual message to the intended recipient, the sender would send the message:

Example 4

Msg: Bid for Car, Are you willing to accept $1,500.00 for your car?
From: 4045551111
To: *674045552222
The message may appear to the recipient as follows:

Example 5

From: Interested Buyer
To: 4045552222

Msg: Bid for Car, Are you willing to accept $1,500.00 for your car?

Alternatively, the network could provide an interactive method of selecting or specifying the desired "From/Anonymous" address that is displayed on the recipient's handset. This can be accomplished by, for example, assigning a specific network block code, e.g., "*nn4045552222", where "nn" represents any network code.

The following example demonstrates a possible SMS text message back to the original sender by the network component to assist the original sender in selecting possible anonymous codes:

Example 6

Reply to this message with one of the following choices:
1. Unknown
2. Anonymous
3. Secret Admirer Or just enter the text you wish to display up to 20 characters The recipient who receives the SMS message may respond with an SMS message that keeps the identity of the recipient anonymous. For example, a response sent by the original recipient to the original sender may appear to the original sender as:

Example 7

To: *67Interested Buyer
From: 4045552222
Msg: Bid for Car, No, too low. However, I would accept at least $2,500.00 for the car.

The network component may then send the following message to the original sender:

Example 8

To: Interested Buyer
From: Blocked
Msg: Bid for car, No, too low. However, I would accept at least $2,500.00 for the car.

Communications between the buyer and seller may then continue on in an anonymous or disguised manner.

FIG. 1 illustrates a block diagram of an SMS network 1 in which the invention may be implemented. Prior to describing the invention and the manner in which it may be implemented in the SMS network 1, the manner in which the network 1 typically operates and is configured will be described. When a user of a wireless device 2 wishes to send an SMS message, the user inputs a text message on the wireless device 2, enters the cellular telephone number of the intended recipient, and selects "Send". The base station (BS) 3 receives the wireless communication from the sent by the wireless device 2 and forwards it to the mobile switching center (MSC) 4. The MSC 4 looks up the global title of the message center associated with the destination telephone number and routes the communication to a signal transfer point (STP) gateway 5.

The communication received by the STP gateway 5 from the MSC 4 is in SS7 format. The STP gateway 5 routes the SS7 communication to an SMS center (SMSC) 6. The mobile-originated SMS message is routed to the SS7 address of the SMSC 6 based on routing information contained in the SS7 communication. The STP gateway 5 is typically connected to other STP gateways to provide flexibility for routing to a number of different locations.

The SMSC 6 analyzes the SS7 communication and uses a routing table to determine the next node in the network 1 to which the SMS message is to be routed. In one particular network configuration that the assignee of the present application uses, the SMSC routes all communications to the message application router (MAR) 7 over the SMPP protocol. The MAR 7 routes the SMPP communication based on login ID to an Open Messaging Gateway (OMG) 8. The OMG 8 uses a routing table to route the SMPP communication to a MAR 9 based on the destination address contained in the SMPP communication. Prior to routing the SMPP communication to MAR 9, the OMG 8 queries a customer database 11 for sender and recipient profile information via a Lightweight Directory Access Protocol (LDAP) connection. The profile information is used by the OMG 8 to determine whether the sender has authorization to send SMS messages and whether the intended recipient has authorization to receive SMS messages.

The MAR 9 then routes the SMPP communication to the proper external short message entity (ESME) 10 based on the ESME bind credentials that the OMG 8 associates with the destination address contained in the SMPP communication. Each ESME has its own bind credentials (i.e., login ID and password) and the ESMEs are distinguished based on these bind credentials. The ESME 10 typically represents a fixed network SMS client, such as, for example, a Wireless Application Protocol (WAP) proxy server, an email gateway or a voicemail server. Once the SMPP communication has been routed to the ESME 10, a connection is established between the SMSC 6 and the ESME 10. Communications between the SMSC 6 and the ESME 10 then take place in order to bind the ESME 10 to the SMSC 6 for the SMPP session.

The STP 5 that receives the SS7 communication may route the communication to a network element known as an IP Transfer Point (ITP) 13. The ITP 13 may be an ITP of the type sold by Cisco Systems, Inc. of 170 West Tasman Drive, San Jose, Calif. 95134. The ITP 13 is capable of converting SS7 communications into SMPP communications and of routing the SMPP communication to the proper ESME 30 for handling the call. The ITP 13 is also capable of converting the SS7 communication into a Signaling Transport (SIGTRAN) communication and of routing the SIGTRAN communication to the proper SMSC 6 for handling the call.

In addition to the functions that an ESME typically performs during an SMPP session, in accordance with an embodiment of the invention, the ESMEs 10 and 30 include intelligence for carrying out the invention, i.e., for stripping off the sender's ID information. However, as described in more detail below, the invention is not limited with respect to the network element in which the functions of the invention are performed. For exemplary purposes, it will be assumed that the ESMEs 10 and 30 comprise the intelligence needed to strip off the sender's ID information and to substitute an identifier such as "Unkown" or an alias selected by the sender into the communication.

The ESMEs 10 and 30 communicate with respective databases 20 and 40 in order to perform the functions associated with the invention. These databases may be separate network elements (e.g., servers) or they may be held and maintained in a common network element. In order to describe the functions performed by the ESME in accordance with the invention, an example of a dialog between an SMSC and the ESME of the invention will be provided with reference to FIG. 2. For this example, it will be assumed that the telephone number of the sender's wireless device is 4045551111 and that the telephone number of the recipient's wireless device is 4045552222. The sender types an SMS message on the sender's wireless device and enters a telephone number prefaced by a predetermined code, such as, for example, "*67". When the sender selects the "Send" option, the sender's wireless device forwards the SMS message to the MSC. Subsequently, the message is forwarded to the SMSC from the MSC and onto the ESME, as described above with reference to FIG. 1.

Figure 2:
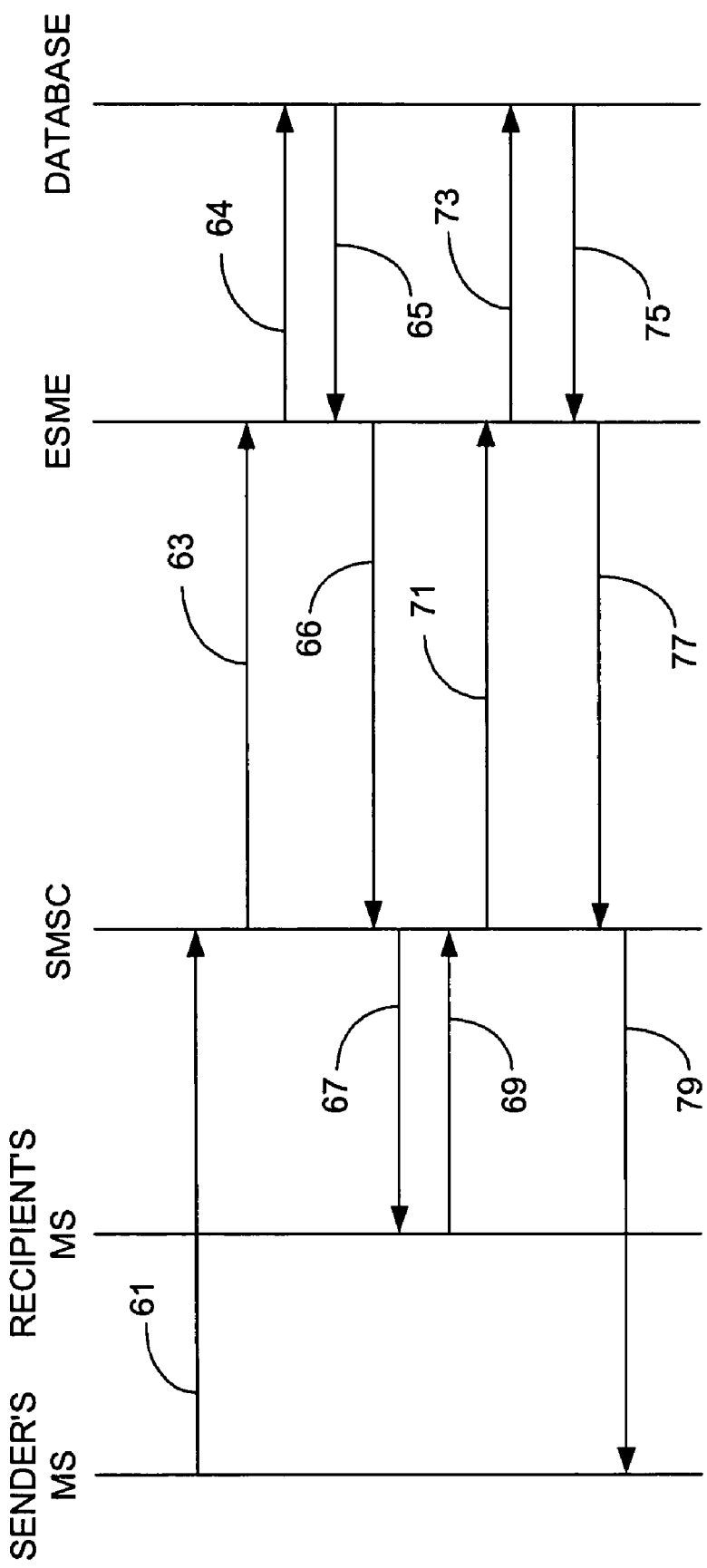
FIG. 2 illustrates a dialog diagram that demonstrates communication between an ESME, an SMSC, a sender's wireless device, and an intended recipient's wireless device.
Figure 3:
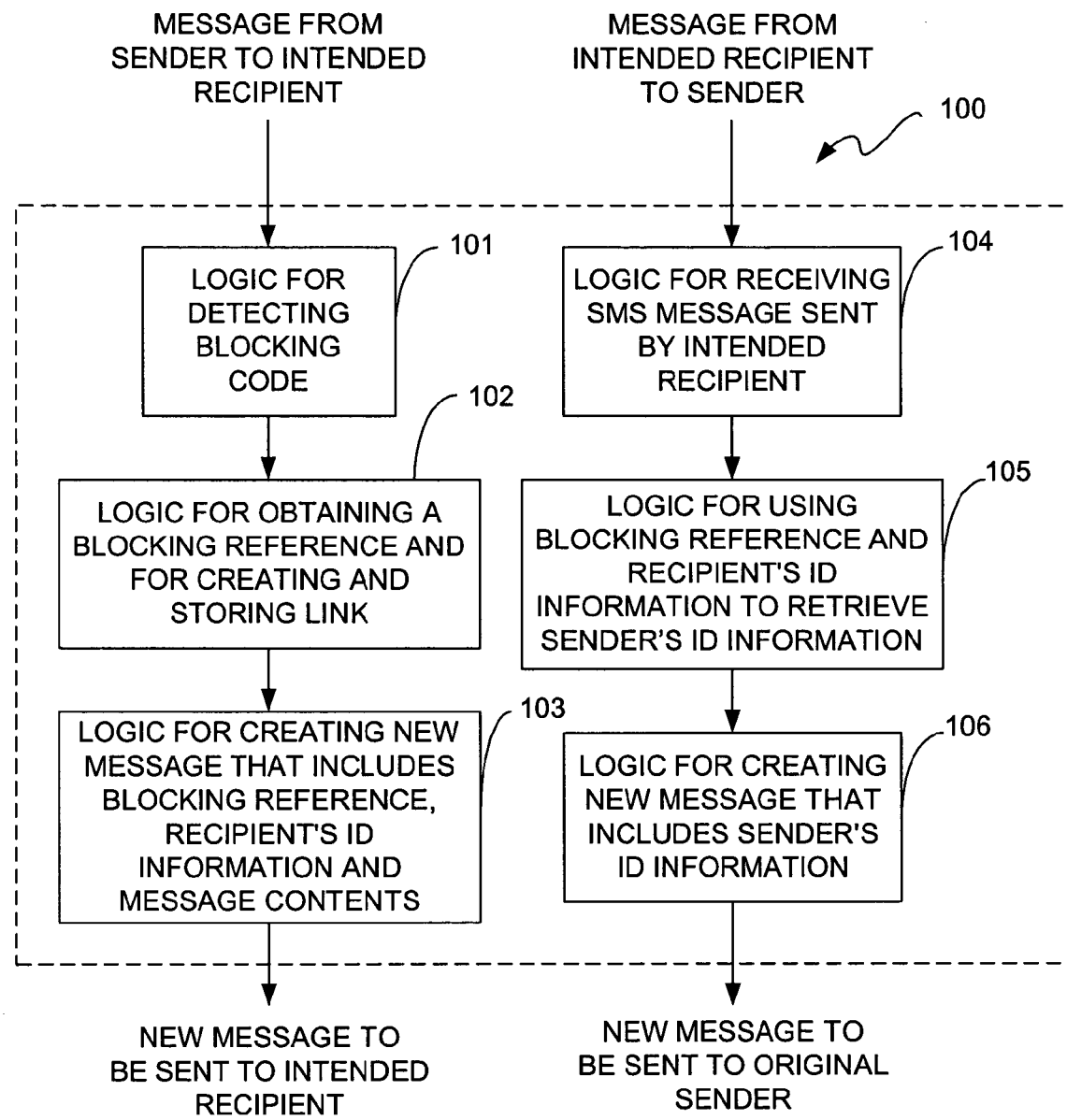
FIG. 3 illustrates a block diagram of the logic of a component of an SMS network in which the invention may be implemented.

The arrow 61 in FIG. 2 indicates the routing of the SS7 communication from the sender's wireless device through the network to the SMSC. The SS7 communication identifies the sender's telephone number as 4045551111 and the recipient's telephone number as *674045552222. The arrow 63 indicates the routing of the corresponding SMPP communication from the SMSC to the ESME. For simplicity, the acknowledgements that are sent by network components in response to receiving communications from other network components are not shown.

When the ESME receives the communication, the ESME creates a new message that has an ID-blocking reference in the place of the sender's telephone number. For example, the ID-blocking reference may be "block1", where the "1" indicates that this is the first blocked message sent to the intended recipient via this particular ESME during a certain time period (e.g., during the current day). During the process of creating the new message, the ESME links the sender's telephone number with a key, which is generated by combining the blocking reference and the recipient's telephone number. The ESME stores the link in the aforementioned database (20 or 40 in FIG. 1) used by the ESME. Arrow 64 corresponds to the ESME requesting a call blocking reference to be associated with the intended recipient's telephone number. Arrow 65 corresponds to the assigned blocking reference being sent from the database to the ESME. The database may be part of the ESME, i.e., ESME local memory, or it may be a memory element that is separate from the ESME.

The new message created by the ESME comprises the blocking reference, the recipient's telephone number (e.g., 4045552222) and a message (e.g., "Are you willing to accept $1,500.00 for your car?"). Arrow 66 corresponds to the routing of the new message from the ESME to the SMSC. The SMSC that receives the new message may be the same SMSC that received the original message or a different SMSC. The SMSC then routes the new message to the STP, which determines which MSC the new message is to be routed. For purposes of simplicity, the routing of the new message to the STP and MSC and the conversion of the SMPP communication to an SS7 communication are not shown in FIG. 2. Arrow 67 represents the routing of the new message from the SMSC through the STP and MSC to the wireless device of the original recipient.

When the original recipient replies to the received SMS message, the reply SMS message comprises the original recipient's telephone number (4045552222), the blocking reference contained in the original sender's message (block1), and the content of the reply message. Arrow 69 represents the routing of the reply SMS message from the original recipient's wireless device to the SMSC via the MSC and the STP. The reply message is then routed from the SMSC to the ESME, as indicated by the arrow 71.

When the ESME receives the reply message, the ESME determines the telephone number of the original sender based on the blocking reference (block1) contained in the reply message and the recipient's telephone number (4045552222). The ESME creates a key by combining the recipient's telephone number and the blocking reference. The key can be generated using these values in a variety of ways, and the invention is not limited to any particular manner for generating the key. The ESME then uses the key to lookup the original sender's telephone number in the aforementioned lookup table. The process of requesting and obtaining the original sender's telephone number from the database is represented by arrows 73 and 75, respectively. The ESME then creates a new message that includes the telephone number of the original sender's wireless device, the reply message contents, and the telephone number of the original recipient's wireless device. The ESME then forwards the reply message onto the SMSC, which forwards the message on to the wireless device of the original sender via the STP and MSC, as indicated by arrows 77 and 79.

During subsequent communications between the original sender and the original recipient within the same SMPP session, the ESME will continue to block the telephone number of the original sender's wireless device and use the key to lookup the original sender's telephone number in the lookup table. In addition, the original recipient may block the telephone number of the original recipient's wireless device when sending reply messages to the original sender. Upon receiving the reply message, the ESME will create a key by combining the telephone number of the original recipient's wireless device with a blocking reference, e.g., "block1", that is associated with the telephone number of the original recipient's wireless device. Subsequently, the key will be used by the ESME to look up the original recipient's telephone number when routing reply messages from the original sender to the original recipient.

It is possible that the original recipient will receive blocked messages from multiple senders over the course of a given time period. If a second sender sends a blocked SMS message to the same intended recipient, the ESME will use a second blocking reference (e.g., "block2") and the telephone number of the second sender's wireless device to generate the key that will be used to lookup the second sender's telephone number in the lookup table. This enables the ESME to distinguish between multiple blocked senders when multiple SMPP sessions are taking place involving the same recipient and multiple blocked senders.

The database used by the ESME may assign blocking references that identify the network carrier. This would allow inter-carrier operation of the invention. For example, blocking references that are assigned by Cingular Wireless networks would include a carrier code that identifies the blocking reference as having been assigned by a Cingular Wireless network. This would allow networks that are operated by different carriers to route blocked messages to the network that assigned the blocking reference. The network that assigned the blocking reference would then lookup the telephone number associated with the blocked reference and route the message to the wireless device associated with that telephone number.

Some people may not be willing to receive a message that is from an unknown source. The databases used by the ESMEs may also contain a list of telephone numbers associated with subscribers that are willing (i.e., whitelist), or are not willing (i.e., blacklist) to receive messages from unknown sources. In this case, when the ESME sends a request to obtain a blocking reference from the database (arrow 64), this will include a request for the database to send back an indication of whether not the telephone number is associated with a subscriber who is willing to receive messages from unknown sources. Alternatively, this could be accomplished by a separate dip by the ESME into the database, which would occur prior to the ESME requesting a blocking reference.

The recipient can reply to an incoming block message to prevent an anonymous message from that sender or any sender from being sent to the recipient's handset. The network component will then send a message back to the sender indicating that the message could not be delivered because the recipient has blocked anonymous messages. Subscribers can also configure the network component to block all anonymous messages. This may be accomplished directly by the subscribers from a web/WAP interface or via provisioning a class of service. This functionality may be implemented in the ESME or in other network elements.

In the event that the ESME determines that the intended recipient is not willing to receive messages from unknown sources, the message sent back to the sender may also provide the sender with the opportunity to provide the sender's identity if the sender wishes to send the message unblocked to the intended recipient. If the sender indicates that the message is to be sent unblocked, the ESME would then forward the original message, which includes the telephone number of the sender's wireless device, to the intended recipient. Thus, the sender would not have to recreate and resend the original message.

Although the invention has been described above as being implemented in logic in an ESME, the invention is not limited to this particular embodiment. The invention may be implemented in a various network components other than in the ESME, such as, for example, in the OMG, in the SMSC or in the STP. Also, the logic that performs the invention may be distributed over multiple network elements.

FIG. 4 illustrates a block diagram of the logic 100 for performing the tasks described above with reference to FIGS. 1 and 2. The logic 100 typically is implemented by a server executing software. The logic 100 may be implemented in an ESME or in some other network component or components. The logic 100 includes logic 101 that detects if the sender's ID information, e.g., wireless telephone number, is prefaced with indicator (e.g., a blocking code) indicating that the ID information associated with the sender is to be blocked. If so, block 102 obtains a blocking reference to be used and creates and stores a link that links the blocking reference to the sender's ID information. Logic 103 creates a new message that includes the blocking reference, the intended recipient's ID information (e.g., wireless telephone number) and the message contents. The new message is then sent to the intended recipient.

Logic 100 includes logic 104 that receives an SMS message sent by the intended recipient to the sender. Logic 104 uses the blocking reference and the original recipient's ID information to retrieve the sender's ID information. Logic 104 then creates a new message that includes the sender's ID information, the message contents and the original recipient's ID information, if the original recipient has not blocked his or her ID information. This message is then sent to the original sender.

It should be noted that the invention has been described with reference to certain embodiments and that the invention is not limited to these embodiments. Variations can be made to the embodiments described herein and all such variations are within the scope of the invention. For example, although the invention has been described with reference to using the MSISDNs as the ID information, other types of ID information may be used, such as, for example, email addresses, names of persons or organizations, etc. Also, as stated above, the invention is not limited to SMS networks or SMS messages. The invention also applies to other types of networks and messaging services. Those skilled in the art will understand, in view of the description provided herein, the manner in which these variations to the embodiments described above can be implemented.

The invention claimed is:

1. A system for blocking an identifier of a device sending a message, the system comprising:
a wireless network;
a sending device on the wireless network, the sending device being a wireless telephone, the sending device having a sender identification, wherein the sending device is capable of sending a message over the network;
a network component on the wireless network, the network component containing logic to receive the message from the sending device, remove the sender identification from the message, and replace the sender identification with a text string, the text string being a user-created alias for the sending device; and
a receiving device on the wireless network,
wherein the sending device prefaces a receiving address of the receiving device with a pre-selected code, the pre-selected code instructing the network component to remove the sender identification, and the receiving device receives the message with the text string such that the sending device remains anonymous to the receiving device, wherein the network component associates the sender identification with a key, the key generated by combining the text string with the receiving address, the network component storing the key in a memory such that the memory may be referenced in order to direct a response to the message back to the sending device.

2. The system of claim 1, wherein the network element stores the text string.

3. The system of claim 2, wherein the receiving device may create the reply to the message using the text string and the reply is sent to the sending device.

4. The system of claim 3, wherein the receiving device blocks the receiving address in the reply.

5. The system of claim 1, wherein the message is a short messaging system (SMS) message.

6. The system of claim 5, wherein the SMS message originates from an email address.

7. The system of claim 1, wherein the message is one of a session initiation protocol (SIP) message sent via voice over internet protocol (VoIP), an instant message sent over an instant messaging service, a pager message sent by interactive messaging, and a multimedia messaging service (MMS) message.

8. The system of claim 1, wherein when the network element receives the pre-selected code the network element prompts the sending device asking the sending device for the alias.

9. The system of claim 1, wherein the text string is a numeric string.

10. The system of claim 1, wherein the text string is an alphanumeric string.

11. The system of claim 1, wherein an interactive program allows the sending device to chose the text string.

12. A method for blocking an identifier of a device, the method comprising:
sending a message over a wireless network, the message containing a pre-selected code specifying to alter a device identifier of a sending device on the message, the sending device being a wireless telephone;
receiving the message at a network element on the wireless network;
removing the device identifier from the message;
replacing the device identifier with a text string, the text string being a user-created alias for the sending device; and
sending the message to a receiving device,
wherein the network element associates the device identifier with a key, the key generated by combining the text string with a receiving address of the receiving device, the network element storing the key in a memory such that the memory may be referenced in order to direct a response to the message back to the sending device.

13. The method of claim 12, further comprising storing the text string at the network element.

14. The method of claim 13, further comprising:
receiving the message at the receiving device;
creating a reply to the message at the receiving device, the reply addressed to the text string; and
delivering the reply to the sending device.

15. The method of claim 14, further comprising blocking a receiving address of the receiving device in the reply.

16. The method of claim 12, wherein the message is a short messaging system (SMS) message.

17. The method of claim 12, wherein the message is one of a session initiation protocol (SIP) message sent via voice over internet protocol (VoIP), an instant message sent over an instant messaging service, a pager message sent by interactive messaging, and a multimedia messaging service (MMS) message.

18. The method of claim 12, further comprising the network element prompting the sending device for the alias when the network element receives the pre-selected code.

19. An apparatus for blocking the identifier of a device, the apparatus comprising:
a server including a memory, the server capable of sending and receiving a message;
logic on the server, the logic to:
detect if a sender identification is prefaced with a blocking code indicating that the sender identification is to be blocked,
obtain a user-created alias and store a link to associate the user-created alias with the sender identification,
create a new message that includes the user-created alias, a recipient address from the message, and contents of the message, and
send the new message to the recipient address,
wherein the server associates the sender identification with a key, the key generated by combining the user-created alias with the recipient address, the server storing the key in the memory such that the memory may be referenced in order to direct a response to the message back to a sending device.

20. The apparatus of claim 19, wherein the message is a short messaging service (SMS) message.

* * * * *